US008881124B2

(12) United States Patent
Baba (10) Patent No.: US 8,881,124 B2
(45) Date of Patent: Nov. 4, 2014

(54) COMPILER DEVICE, COMPILER PROGRAM, AND LOOP PARALLELIZATION METHOD

(75) Inventor: Daisuke Baba, Osaka (JP)

(73) Assignee: Panasonic Corporation, Osaka (JP)

( * ) Notice: Subject to any disclaimer, the term of this patent is extended or adjusted under 35 U.S.C. 154(b) by 87 days.

(21) Appl. No.: 13/638,773

(22) PCT Filed: Dec. 13, 2011

(86) PCT No.: PCT/JP2011/006941
§ 371 (c)(1),
(2), (4) Date: Oct. 1, 2012

(87) PCT Pub. No.: WO2012/086148
PCT Pub. Date: Jun. 28, 2012

(65) Prior Publication Data
US 2013/0024849 A1  Jan. 24, 2013

(30) Foreign Application Priority Data
Dec. 21, 2010  (JP) .................................. 2010-284402

(51) Int. Cl.
*G06F 9/45* (2006.01)

(52) U.S. Cl.
CPC ................ *G06F 8/433* (2013.01); *G06F 8/452* (2013.01); *G06F 8/443* (2013.01); *G06F 8/4452* (2013.01)
USPC ............ 717/150; 717/140; 717/149; 717/160

(58) Field of Classification Search
CPC ....... G06F 8/4452; G06F 8/443; G06F 8/452; G06F 8/4442; G06F 8/433
See application file for complete search history.

(56) References Cited

U.S. PATENT DOCUMENTS

| 4,833,606 A | 5/1989 | Iwasawa et al. |
| 5,634,059 A | 5/1997 | Zaiki |

(Continued)

FOREIGN PATENT DOCUMENTS

| JP | 63-94368 | 4/1988 |
| JP | 7-110800 | 4/1995 |

(Continued)

OTHER PUBLICATIONS

Feijian Sun, Automatic program parallelization using stateless parallel processing architecture, 2004, pp. 5-9 and 45-50.*
Rudolf Eigenmann, Parallelizing and Vectorizing Compilers, 2000, pp. 1-15.*

(Continued)

*Primary Examiner* — Thuy Dao
*Assistant Examiner* — Mongbao Nguyen
(74) *Attorney, Agent, or Firm* — Wenderoth, Lind & Ponack, L.L.P.

(57) ABSTRACT

According to the conventional loop parallelization method, when a loop in which a value of a loop-carried dependency variable can be calculated in all of the iterations without sequentially executing the loop from the start, it is determined that DOALL parallelization is not applicable due to the loop-carried dependency variable. Accordingly, the loop is sequentially executed or parallelized by using DOACROSS parallelization that executes a loop including a loop-carried dependency variable. That is, there is a problem that an expression including a loop-carried dependency cannot be parallelized and efficiently processed with use of a multi-processor. By generating initial value calculating codes, the loop-carried dependency in a source code prior to parallelization can be solved, and by dividing a loop included in the source code into subloops that can be executed in parallel, the multi-processor can efficiently process the source code.

7 Claims, 10 Drawing Sheets

(56) References Cited

U.S. PATENT DOCUMENTS

| | | | |
|---|---|---|---|
| 8,087,010 B2* | 12/2011 | Eichenberger et al. | 717/150 |
| 8,151,252 B2* | 4/2012 | Song et al. | 717/140 |
| 8,296,746 B2* | 10/2012 | Takayama et al. | 717/149 |
| 8,448,155 B2* | 5/2013 | Bordelon et al. | 717/149 |
| 8,549,501 B2* | 10/2013 | Eichenberger et al. | 717/150 |
| 8,739,141 B2* | 5/2014 | Song et al. | 717/150 |
| 2001/0020294 A1 | 9/2001 | Ogawa et al. | |
| 2004/0098711 A1* | 5/2004 | Song et al. | 717/150 |
| 2007/0169057 A1* | 7/2007 | Silvera et al. | 717/160 |
| 2007/0169061 A1* | 7/2007 | Bera et al. | 717/160 |
| 2007/0277162 A1* | 11/2007 | Tanaka et al. | 717/140 |
| 2008/0052689 A1* | 2/2008 | Archambault et al. | 717/140 |
| 2009/0077545 A1* | 3/2009 | Silvera et al. | 717/160 |
| 2009/0307673 A1* | 12/2009 | Eichenberger et al. | 717/160 |
| 2009/0307674 A1* | 12/2009 | Ng et al. | 717/160 |
| 2011/0067014 A1* | 3/2011 | Song et al. | 717/149 |

FOREIGN PATENT DOCUMENTS

| | | |
|---|---|---|
| JP | 11-161500 | 6/1999 |
| JP | 2000-20482 | 1/2000 |
| JP | 2001-249818 | 9/2001 |
| JP | 2005-327320 | 11/2005 |
| JP | 2010-191506 | 9/2010 |

OTHER PUBLICATIONS

Michael Ringenburg, Optimizing Loop-level Parallelism in Cray XMT applications, 2009, pp. 1-15.*

International Search Report issued Jan. 17, 2012 in corresponding International Application No. PCT/JP2011/006941.

Tan Watanabe, "UNIX magazine 2009 Summer (July)", Jul. 1, 2009, vol. 24, No. 3, pp. 90-93 (with partial English translation).

A. V. Aho et al., "Compilers Principles, Techniques and Tools", 2nd Edition, 2007, pp. 738-740.

* cited by examiner

COMPILER DEVICE, COMPILER PROGRAM, AND LOOP PARALLELIZATION METHOD

TECHNICAL FIELD

The present invention relates to a compiler technology and loop parallelization method for generating an object program by parallelizing a source program for sequential execution.

BACKGROUND ART

Figure 9A:
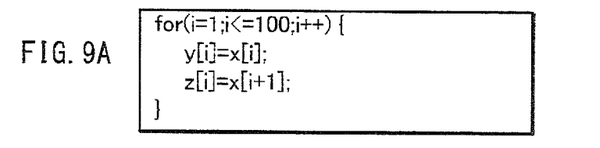
FIGS. 9A-9D show data dependencies.
Figure 9B:
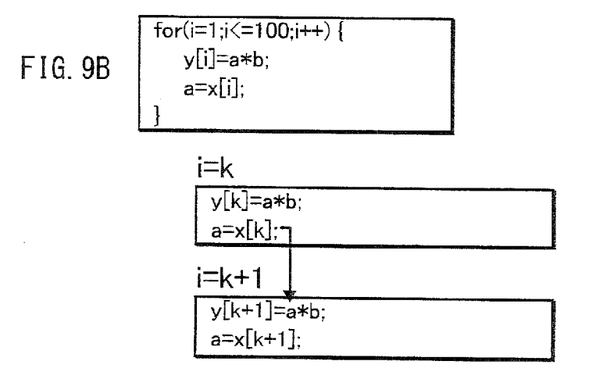

Parallel processing of an object program is an important function of a multiprocessor for effectively using each processor and improving operating performance. There has been known an approach for generating a parallelized object program by grouping a loop into a plurality of subloops in units of repeated statement groups (hereinafter, referred to as iteration). Some conventional loop parallelization methods are used for parallelizing only loops without a data dependency (hereinafter, referred to as DOALL parallelization) (see Non-Patent Literature 1, for example). Here, a data dependency refers to a situation in which a certain statement B cannot be executed until another statement A completes. When a variable a causes the data dependency (for example, the statement A substitutes a certain value into the variable a, and the statement B refers to the variable a), such a situation is expressed as the loop has "a data dependency on the variable a". The DOALL parallelization is aimed at a loop that does not contain a data dependency as shown in FIG. 9A, for example.

When the loop has a data dependency and the above statements A and B belong to different iterations, one of the iterations to which the statement B belongs is dependent on the other iteration to which the statement A belongs. When the loop has a data dependency between two or more iterations, parallelization of the loop is difficult since it is impossible to simply apply DOALL parallelization.

Data dependencies between iterations are classified into three: a data dependency that occurs when a value is substituted in an iteration and the substituted value is then referred to in the subsequent iteration (hereinafter, referred to as loop-carried dependency); a data dependency that occurs when a value of a variable is referred to in an iteration, and in the subsequent iteration, another value is substituted into the variable that has been referred to (hereinafter, referred to as pre-reference dependency); and a data dependency that occurs when a value is substituted into a variable in an iteration, and another value is then substituted into the same variable in the subsequent iteration (hereinafter, referred to as output dependency).

The following explains specific examples of data dependencies between iterations and problems that occur in parallelizing with reference to FIGS. 9A-9D. A loop shown in FIG. 9B has a loop-carried dependency on a variable a. In the case where a loop is sequentially executed, when an iteration using $i=k+1$ is executed, the variable a refers to the execution result of an iteration using $i=k$. In contrast, in the case where a loop is parallelized by being divided in units of iterations, each iteration is executed in an order different from an order in which the loop is sequentially executed. Accordingly, a value of the variable a is not necessarily $x[k]$ when $y[k+1]=a*b$ is executed. Therefore, there is a problem that the value of a variable $y[k+1]$ is not the same as the result of sequential execution of the loop.

Figure 9C:
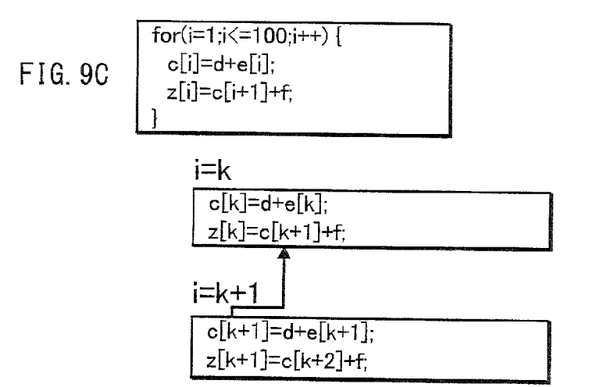

An array c shown in FIG. 9C is an example of a pre-reference dependency. In this example, it is assumed that values are substituted into $c[2]$-$c[101]$ before a loop is executed. When a loop is divided in units of iterations to be parallelized, each iteration is executed in an order different from an order in which the loop is sequentially executed. An iteration using $i=k+1$ might therefore be executed prior to an iteration using $i=k$. In this case, since the result of iteration using $i=k+1$ is substituted into $c[k+1]$ when the iteration using $i=k$ is executed, there is a problem that the value of $z[k]$ is not the same as the result of sequential execution of the loop.

Figure 9D:
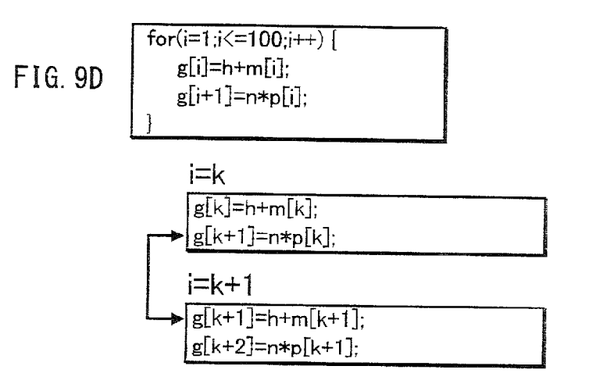

An array g shown in FIG. 9D is an example of output dependency. When a loop is divided in units of iterations to be parallelized, each iteration is executed in an order different from an order in which the loop is sequentially executed. An iteration using $i=k+1$ might therefore be executed prior to an iteration using $i=k$. In this case, since the iteration using $i=k$ overwrites the value of $g[k+1]$, there is a problem that the value of $g[k+1]$ is not the same as the result of sequential execution of the loop.

Figure 10:
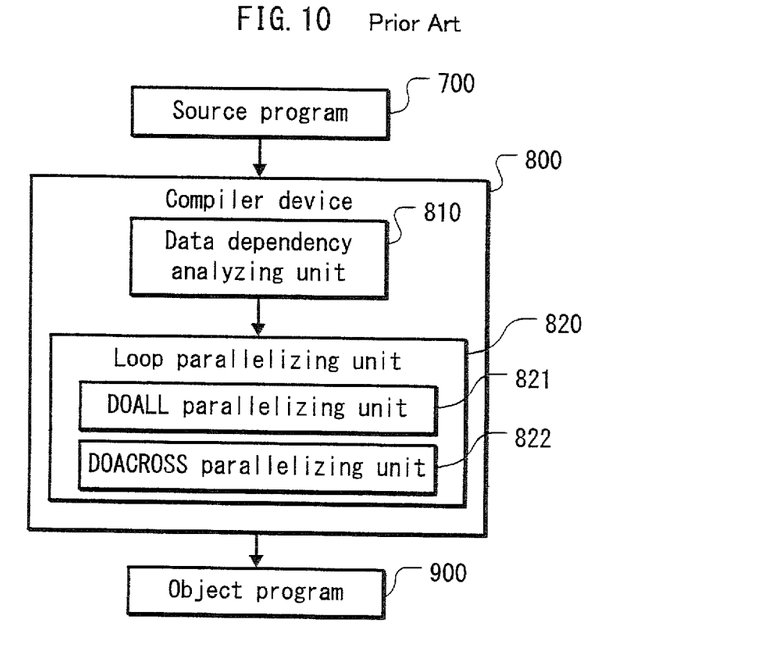
FIG. 10 shows configuration of a conventional compiler device.

Patent Literature 1 discloses a conventional method for parallelizing a loop containing a data dependency. FIG. 10 shows a compiler device disclosed in Patent Literature 1. A compiler device 800 acquires a source program 700 that is for sequential execution and written in FORTRAN, for example, as input, and outputs an object program 900 for parallel execution. A loop parallelizing unit 820 included in the compiler device 800 includes DOALL parallelizing unit 821 and a DOACROSS parallelizing unit 822. The DOALL parallelizing unit 821 parallelizes a loop that can be parallelized using DOALL parallelization. The DOACROSS parallelizing unit 822 parallelizes, by inserting a statement for executing synchronization among processors into multiloop, a loop that can be parallelized using pipeline parallelization (hereinafter, referred to as DOACROSS parallelization).

Further, another conventional example is disclosed by Patent Literature 2. According to a compiler device disclosed by Patent Literature 2, when a loop has a pre-reference dependency, a value of a variable with a pre-reference dependency is stored in a temporary variable beforehand so that another value is not substituted into the variable with the pre-reference dependency before its value is used. In this case, the pre-reference dependency is solved by replacing the variable with the pre-reference dependency with the temporary variable, when the variable with the pre-reference dependency is referred to in a statement. As a result, the loop can be parallelized.

CITATION LIST

Patent Literature

[Patent Literature 1]
Japanese Patent Application Publication No. 2005-327320
[Patent Literature 2]
Japanese Patent Application Publication No. 2010-191506

Non-Patent Literature

[Non-Patent Literature 1]
A. V. Aho, M. S. Lam, R. Sethi and J. D. Ullman, translated by Ken'ichi Harada, "Information & Computing", $2^{nd}$ ed., pp. 790-793, SAIENSU-SHA Co., Ltd., May 25, 2009.

SUMMARY OF INVENTION

Technical Problem

However, the compiler device pertaining to Patent Literature 1 cannot execute parallelization using DOALL parallelization when it is determined that a loop has a loop-carried dependency, and cannot execute parallelization when DOACROSS parallelization is not applicable. Further, when a loop is parallelized by using DOACROSS parallelization, a synchronization statement is used to maintain an order in which iterations containing a loop-carried dependency are executed. Therefore, since a loop-carried dependency exists between a depending iteration and a depended iteration, these iterations cannot be executed in parallel.

On the other hand, according to the compiler device pertaining to Patent Literature 2, when a loop contains a pre-reference dependency, that is, when an iteration requires a value that is to be substituted in the subsequent iteration, a value of a pre-reference dependency variable will be copied beforehand as a value of a temporary variable, and in an iteration in which the value of the pre-reference dependency variable is referred to, the value is replaced with the temporary variable. Thus, even if the value of pre-reference dependency variable is overwritten by a value that has been substituted in an iteration in which the value is substituted into the pre-reference dependency variable, the original value of the pre-reference dependency variable before the loop starts can be acquired from the temporary variable when the value is referred to. The technology pertaining to the Patent Literature 2, however, cannot solve the loop-carried dependency. This is because, when a loop contains a loop-carried dependency, the value that the iteration in which the variable is referred to needs is not the value of loop-carried dependency variable that is stored before the loop starts. That is, the value that the iteration in which the variable is referred to needs is a value that is substituted in the iteration in which the value is substituted in the loop-carried dependency variable.

The present invention has been achieved to solve the above conventional problems, and an aim thereof is to provide a compiler device, a compiler program and a loop parallelization method for parallelizing a loop containing a loop-carried dependency.

Solution to Problem

In order to solve the above problems, a compiler device pertaining to the present invention is a compiler device for generating an object program for parallel execution from a source program for sequential execution, comprising: a data dependency analyzing unit configured to analyze whether a loop included in the source program includes one or more loop-carried dependency variables, each loop-carried dependency variable being a variable whose value substituted thereto in one iteration of the loop is referred to in another iteration that is executed after the one iteration; a loop parallelization determining unit configured to determine whether the loop is a parallelizable loop when the loop is analyzed to include the one or more loop-carried dependency variables, the parallelizable loop being a loop including one or more loop-carried dependency variables whose values are calculable in all iterations of the loop regardless of whether the loop is sequentially executed; and an initial value calculating code adding unit configured to determine, in order to divide the loop into a plurality of subloops, start positions of the plurality of subloops when the loop is determined as the parallelizable loop, to generate, for each start position, an initial value calculating code for calculating values of the one or more loop-carried dependency variables at the corresponding start position, to divide the loop into the plurality of subloops based on the start positions, and to generate the object program such that each initial value calculating code is executed prior to the corresponding subloop.

Further, a compiler program pertaining to the present invention is a compiler program for generating an object program for parallel execution from a source program for sequential execution, comprising the steps of: analyzing whether a loop included in the source program includes one or more loop-carried dependency variables, each loop-carried dependency variable being a variable whose value substituted thereto in one iteration of the loop is referred to in another iteration that is executed after the one iteration; determining whether the loop is a parallelizable loop when the loop is analyzed to include the one or more loop-carried dependency variables, the parallelizable loop being a loop including one or more loop-carried dependency variables whose values are calculable in all iterations of the loop regardless of whether the loop is sequentially executed; and determining, in order to divide the loop into a plurality of subloops, start positions of the plurality of subloops when the loop is determined as the parallelizable loop, generating, for each start position, an initial value calculating code for calculating values of the one or more loop-carried dependency variables at the corresponding start position, dividing the loop into the plurality of subloops based on the start positions, and generating the object program such that each initial value calculating code is executed prior to the corresponding subloop.

Further, a recording medium pertaining to the present invention is a recording medium on which a compiler program is recorded, the compiler program being for generating an object program for parallel execution from a source program for sequential execution, the compiler program comprising the steps of: analyzing whether a loop included in the source program includes one or more loop-carried dependency variables, each loop-carried dependency variable being a variable whose value substituted thereto in one iteration of the loop is referred to in another iteration that is executed after the one iteration; determining whether the loop is a parallelizable loop when the loop is analyzed to include the one or more loop-carried dependency variables, the parallelizable loop being a loop including one or more loop-carried dependency variables whose values are calculable in all iterations of the loop regardless of whether the loop is sequentially executed; and determining, in order to divide the loop into a plurality of subloops, start positions of the plurality of subloops when the loop is determined as the parallelizable loop, generating, for each start position, an initial value calculating code for calculating values of the one or more loop-carried dependency variables at the corresponding start position, dividing the loop into the plurality of subloops based on the start positions, and generating the object program such that each initial value calculating code is executed prior to the corresponding subloop.

Further, a loop parallelization method pertaining to the present invention is a loop parallelization method for generating an object program for parallel execution from a source program for sequential execution, comprising the steps of: analyzing whether a loop included in the source program includes one or more loop-carried dependency variables, each loop-carried dependency variable being a variable whose value substituted thereto in one iteration of the loop is referred to in another iteration that is executed after the one iteration; determining whether the loop is a parallelizable loop when the loop is analyzed to include the one or more loop-carried dependency variables, the parallelizable loop being a loop including one or more loop-carried dependency variables whose values are calculable in all iterations of the loop regardless of whether the loop is sequentially executed; and determining, in order to divide the loop into a plurality of subloops, start positions of the plurality of subloops when the loop is determined as the parallelizable loop, generating, for each start position, an initial value calculating code for calculating values of the one or more loop-carried dependency variables at the corresponding start position, dividing the loop into the plurality of subloops based on the start positions, and generating the object program such that each initial value calculating code is executed prior to the corresponding subloop.

Advantageous Effects of Invention

According to the above structures, when values of loop-carried dependency variables in all iterations can be calculated regardless of whether the loop is sequentially executed from the start, the loop can be divided into a plurality of subloops and the subloops can be executed in parallel without affecting the result of calculation by adding an initial value calculating code for calculating a value of a loop-carried dependency variable in the first iteration of each subloop.

DESCRIPTION OF EMBODIMENT

Figure 1:
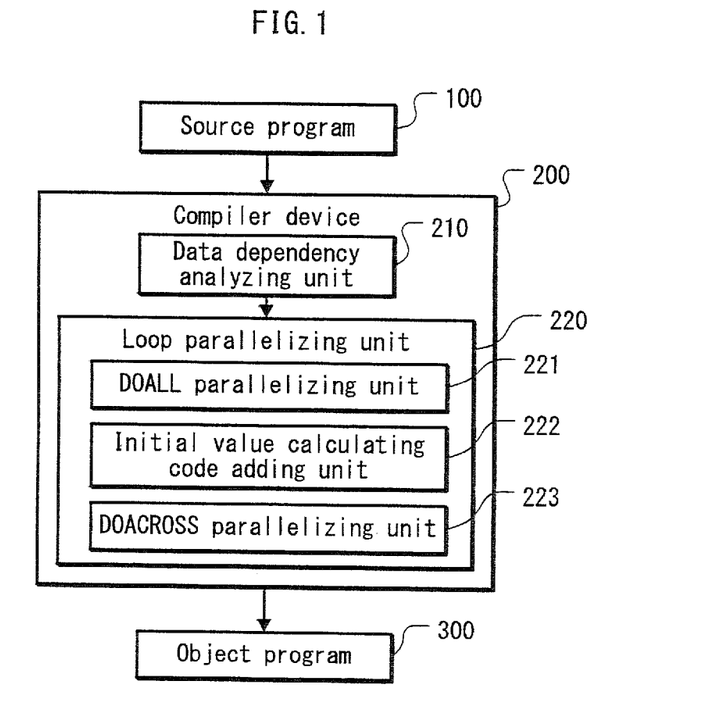
FIG. 1 shows configuration of a compiler device pertaining to an embodiment of the present invention.

An embodiment of the present invention is described below with reference to the drawings.
<Structure>
FIG. 1 shows the configuration of a compiler device 200 that parallelizes a loop, pertaining to an embodiment of the present invention. The compiler device 200 acquires, as input, a source program 100 that is for sequential execution and written in C language, for example, and outputs an object program 300 that is for parallel execution and written in OpenMP C language, for example. The compiler device 200 includes a data dependency analyzing unit 210 and a loop parallelizing unit 220.

The data dependency analyzing unit 210 analyzes whether a loop included in the source program 100 contains a loop-carried dependency variable. As described above, a loop-carried dependency variable is a variable whose value substituted thereto in one iteration is referred to in the subsequent iteration that is executed after the one iteration. In other words, focusing on one iteration in a loop containing a loop-carried dependency variable, it is also possible to say that a loop-carried dependency variable is a variable whose value is substituted after referred to in the same iteration. Accordingly, it is possible to analyze whether a variable is a loop-carried variable by determining the variable satisfies such a condition. This is because a substituted value is not updated until another value is substituted in the subsequent iteration, and the substituted value is referred to not in the current iteration but in the subsequent iteration.

The loop parallelizing unit 220 receives, from the data dependency analyzing unit 210, the analysis result whether each loop contains a loop-carried dependency variable, determines whether all of the loops included in the source program 100 can be parallelized in units of iterations, and converts loops that have been determined to be parallelizable using a parallelization method so as to generate the object program 300.

The loop parallelizing unit 220 includes a DOALL parallelizing unit 221, an initial value calculating code adding unit 222, and a DOACROSS parallelizing unit 223. These units parallelize loops.

The DOALL parallelizing unit 221 has the same function as the DOALL parallelizing unit 821 disclosed in Patent Literature 2. The DOALL parallelizing unit 221 parallelizes, by using a conventional parallelization method, loops that have been determined to be parallelizable by using DOALL parallelization.

The initial value calculating code adding unit 222 parallelizes, by using initial value calculating code addition parallelization, loops that the loop parallelizing unit 220 has determined to be parallelizable by using initial value calculating code addition parallelization. The initial value calculating code addition parallelization will be described later in details.

Figure 2:
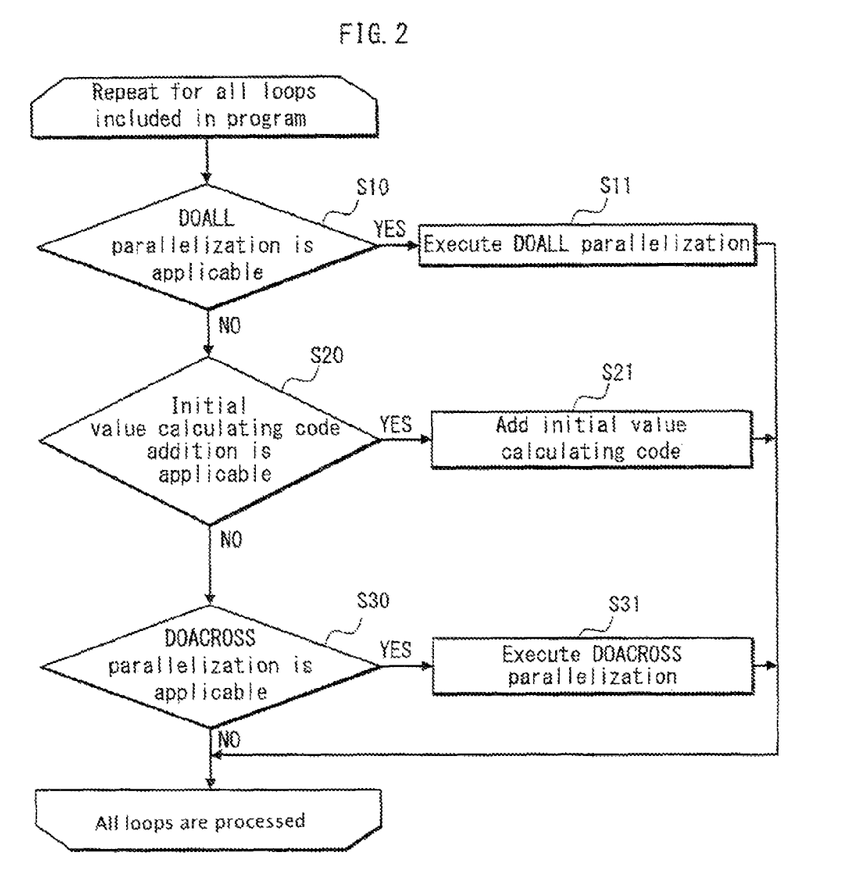
FIG. 2 shows the flow of a loop parallelizing unit pertaining to the embodiment of the present invention.

The DOACROSS parallelizing unit 223 has the same function as the DOACROSS parallelizing unit 822. The DOACROSS parallelizing unit 223 parallelizes, by using pipeline parallelization, loops that the loop parallelizing unit 220 has determined to be parallelizable by using DOACROSS parallelization.
<Operations>
According to the above structure, description is made on operations of the compiler device 200 pertaining to the embodiment of the present invention.
(1) Overview of Loop Parallelization FIG. 2 shows the flow of the loop parallelizing unit 220 pertaining to the embodiment of the present invention. With reference to the flow shown in FIG. 2, description is made on operations performed by the loop parallelizing unit 220.

The loop parallelization determining unit 220 determines whether each of the loops included in the source program 100 can be parallelized using DOALL parallelization, initial value calculating code addition parallelization, or DOACROSS parallelization.

For each loop, the loop parallelizing unit 220 receives, from the data dependency analyzing unit 210, the analysis result indicating whether a loop-carried dependency variable is contained, and determines whether DOALL parallelization is applicable (S10). When DOALL parallelization is applicable, the DOALL parallelizing unit 221 executes DOALL parallelization (S11). Note that an operation performed by the loop parallelizing unit 220 in S10 is the same as that of the loop parallelizing unit 820, and an operation performed by the DOALL parallelizing unit 221 in S11 is the same as that of the DOALL parallelizing unit 821.

When it is determined that DOALL parallelization is not applicable (S10: NO), the loop parallelizing unit 220 determines whether initial value calculating code addition parallelization is applicable (S20). When initial value calculating code addition parallelization is applicable, the initial value calculating code adding unit 222 executes the initial value calculating code addition parallelization (S21). If a loop can be parallelized by using the initial value calculating code addition parallelization, values of the loop-carried dependency variables contained in all of the iterations can be calculated without sequentially executing loops. The determination as to whether the initial value calculating code addition parallelization is applicable (S20) and initial value calculating code addition parallelization (S21) will be described later in details.

When it is determined that initial value calculating code addition parallelization is not applicable (S20: NO), the loop parallelizing unit 220 determines whether DOACROSS parallelization is applicable (S30). When the DOACROSS parallelization is applicable, the DOACROSS parallelizing unit 223 executes DOACROSS parallelization (S31). Note that an operation performed by the loop parallelizing 220 in S30 is the same as that of the loop parallelizing unit 820, and an operation performed by the DOACROSS parallelizing unit 223 in S31 is the same as that of the DOACROSS parallelizing unit 822.

When it is determined in S30 that DOACROSS parallelization is not applicable, parallelization is not executed, and the subsequent loop in the source program 100 is processed in S10. A loop that has not been parallelized is sequentially executed.

(2) Judgment as to Whether Loop can be Parallelized

Figure 3:
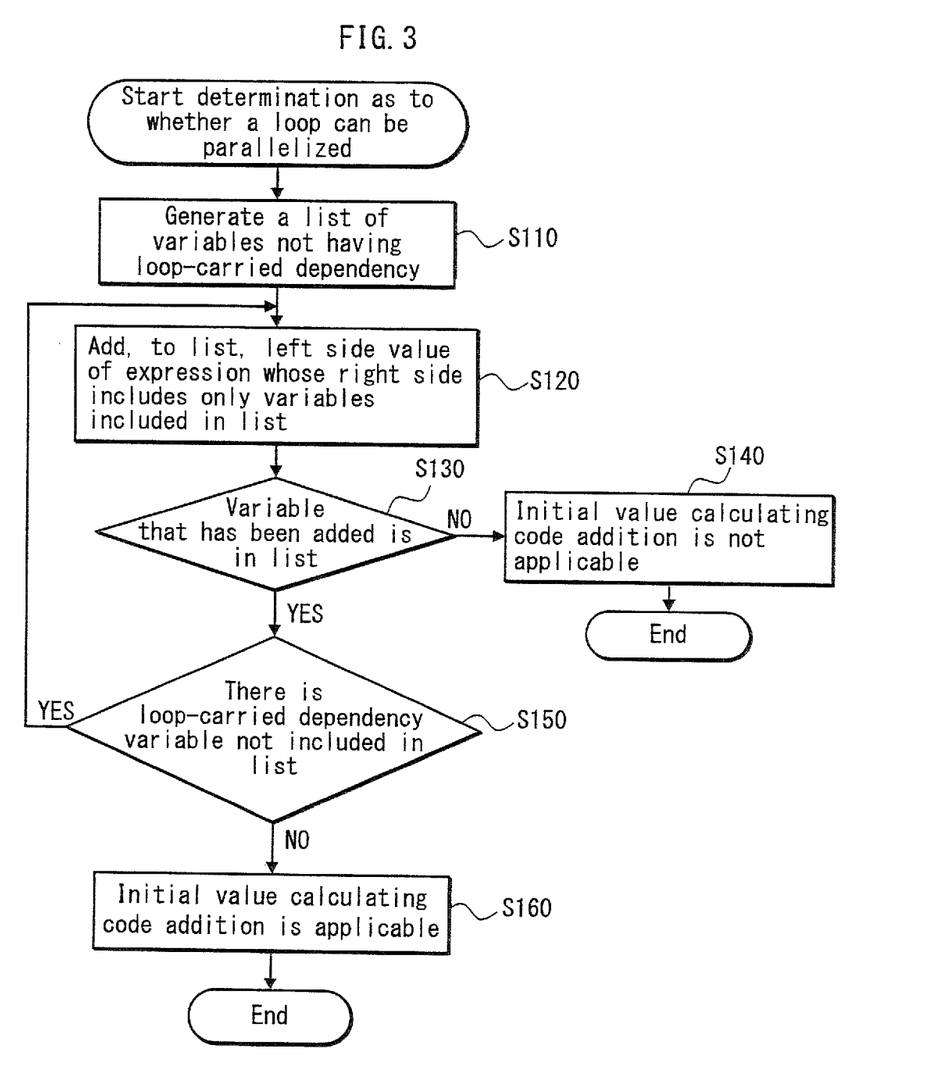
FIG. 3 shows the flow of operations executed by a loop parallelizing unit pertaining to the embodiment of the present invention so as to determine whether a loop can be parallelized.

FIG. 3 shows the flow of the loop parallelizing unit 220 in S20 pertaining to the embodiment of the present invention. Description is made on determination as to whether initial value calculating code addition parallelization is applicable in S20 with reference to the flow shown in FIG. 3.

The loop parallelizing unit 220 receives, from the data dependency analyzing unit 210, the analysis result indicating whether a loop has a loop-carried dependency, and generates a list of variables that are contained in the loop and are not loop-carried dependency variables (S110). Since these variables are not loop-carried dependency variables, values of these variables do not depend on an execution result of each iteration included in the loop. It is therefore possible to calculate values of these variables regardless of whether the loop is sequentially executed. Such a variable whose value can be calculated in all of the iterations is hereinafter referred to as a calculable variable, and the above generated list is a list of calculable variables.

The loop parallelizing unit 220 adds, to the list, a variable on the left side of an expression whose variable on left side is not in the list and whose variables of right side are all in the list (S120). Although the added variable is a loop-carried dependency variable, the added variable depends only on calculable variables. The added variable therefore becomes a calculable variable, which can be calculated from the expression that includes only calculable variables.

Subsequently, the loop parallelizing 220 checks whether there is the variable that has been added to the list in S120 (S130). When there is not the variable that has been added, it is determined that initial value calculating code addition parallelization is not applicable (S140), and the result of determination performed in S20 is determined to be NO in S140. The detail is described later. The loop parallelizing unit 220 determines whether such a loop can be parallelized by using DOACROSS parallelization (S30).

When there is the variable that has been added to the list in S120, the loop parallelizing unit 220 checks whether the list includes all of the loop-carried dependency variables in the loop (S150). When all of the loop-carried dependency variables are listed up, the loop parallelization determining unit 220 determines that initial value calculating code addition parallelization is applicable (S150), and in S150, the result of determination performed in S20 is determined to be YES. In this case, all of the loop-carried dependency variables are calculable variables, and accordingly, values of the loop-carried dependency variables can be calculated in all of the iterations regardless whether a loop is sequentially executed. According to this, the initial value calculating code adding unit 222 parallelizes the loop (S21).

When not all of the loop-carried dependency variables are listed up in S150, the processing is executed again from S120 so as to determine whether a loop-carried dependency variable that is not in the list depends on a newly added calculable variable.

If the loop includes a loop-carried dependency variable that is not a calculable variable, it is determined to be YES in S150 since the loop-carried dependency variable that is not a calculable variable is not in the list when all of the calculable variables are listed up, and it is then determined to be NO in S130 since there is not any calculable variable to be added to the list in S120 that has been executed again. As a result, it is determined that initial value calculating code addition parallelization is not applicable as described above.

(3) Initial Value Calculating Code Addition Parallelization

Figure 4:
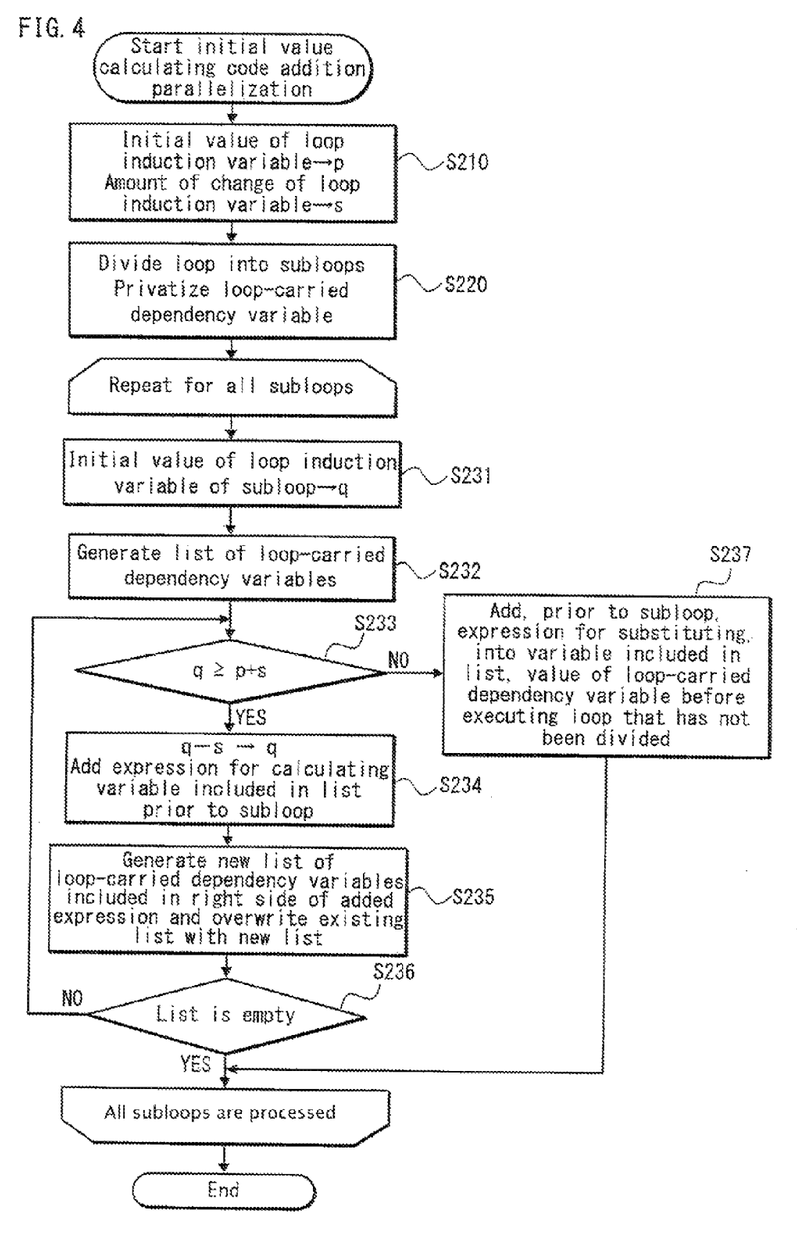
FIG. 4 shows the flow of initial value calculating code addition parallelization pertaining to the embodiment of the present invention.

FIG. 4 shows the flow of the operation S21 performed by the initial value calculating code adding unit 222 pertaining to the embodiment of the present invention. Description is made on parallelization operations by using initial value calculating code addition parallelization executed in S21 with reference to the flow shown in FIG. 4.

The initial value calculating code adding unit 222 stores, in a variable p, the initial value of an induction variable of the loop before division thereof, and stores, in a variable s, an increment amount of the induction variable when an iteration completes and the subsequent iteration is executed (S210).

When the initial value calculating code adding unit 222 assigns a loop composed of M iterations to N processors, the initial value calculating code adding unit 222 divides the loop in units of M/N iterations and assigns M/N iterations to each processor. The initial value calculating code adding unit 222 privatizes a loop-carried dependency variable of each of subloops generated by dividing a loop with use of a variable unique to each subloop, converts the privatized variable to another variable that uses a unique area for each processor, and outputs the converted variable to the object program 300 (S220).

The initial value calculating code adding unit 222 executes processing from S231 to S237 for each subloop generated by division of the loop in S220.

The initial value calculating code adding unit 222 stores, in a variable q, the initial value of an induction variable of a subloop (S231).

The initial value calculating code adding unit 222 generates a list of loop-carried dependency variables based on information acquired from the data dependency analyzing unit 210 (S232). This list includes loop-carried dependency variables whose values of the first iteration in a subloop are not calculated.

The initial value calculating code adding unit 222 compares variable q with the sum of the variable p and the variable s (S233). When q is smaller than p+s, an expression for substituting the original loop-carried dependency variable prior to privatization to the variable included in the list is added to the object program 300 as an initial value calculating code (S237). This is because a loop-carried dependency variable in an iteration with the induction variable q depends not on an iteration with the induction variable q-s in the loop prior to division (iteration whose value of the induction variable is less than p does not exist in the loop), but on the initial value of the loop-carried dependency variable before executing an iteration with the induction variable p, i.e., before executing the loop.

An initial value calculating code is added to the object program 300 so as to be executed prior to the corresponding subloop. Further, if an initial value calculating code corresponding to the same subloop has been already added to the object program 300, a new initial value calculating code is added to be executed prior to the existing initial value calculating code. Note that the object program 300 is constituted such that the initial value calculating code is executed after a code for substituting a value into the original variable before privatized.

When q is equal to or greater than p+s in S233, the initial value calculating code adding unit 222 substitutes q-s into q, and adds, as an initial value calculating code, an expression that is included in the loop and whose left side includes the variable in the list (S234). In this case, a value of the variable q is used as a value of the induction variable used in the added expression.

The initial value calculating code adding unit 222 generates a list of the loop-carried dependency variables on the right side of expression of the initial value calculating code that is added in S234, and overwrites the list generated in S232 or the list previously generated in S235 with the newly generated list (S235).

The initial value calculating code adding unit 222 checks whether the generated list includes a variable in S235, and when the variable is included, the processing is executed again from S233. When no variable is included in the list, parallelization of the subloop completes, and initial value calculating code addition parallelization is executed from S231 on another subloop which has been generated in S220 and to which an initial value calculation code has not been added (S236).

<Parallelization Example of Program>

Figure 5:
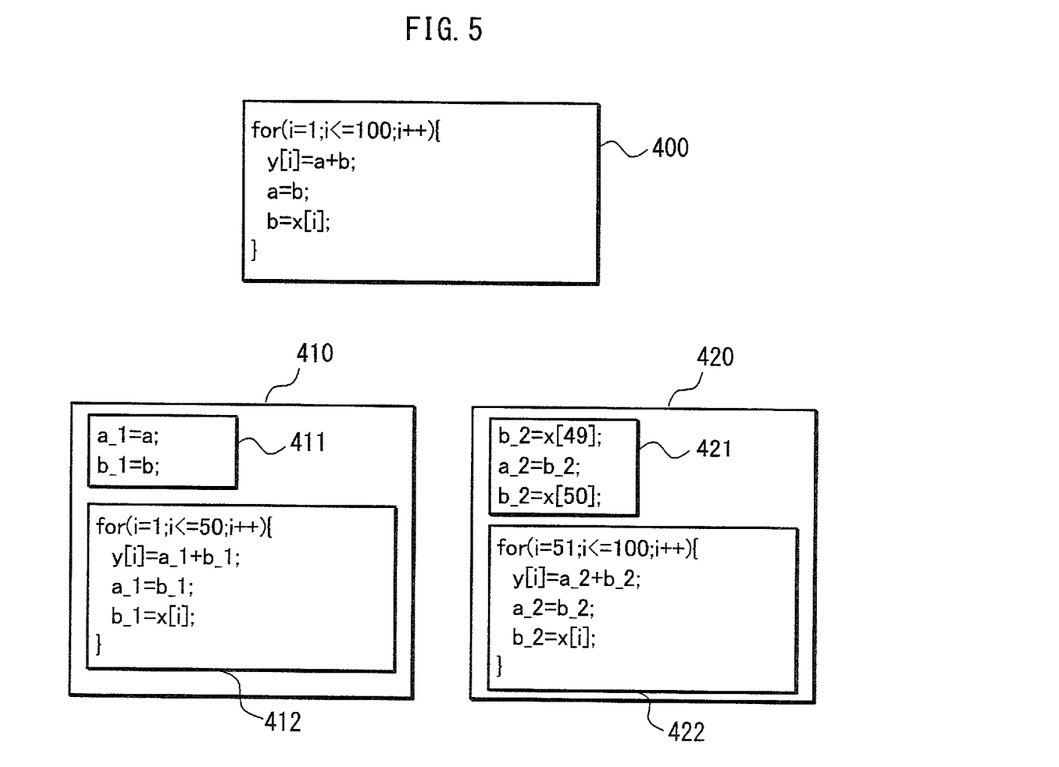
FIG. 5 shows a source program and an object program pertaining to the embodiment of the present invention.

FIG. 5 shows an example of programs before and after initial value calculating code addition parallelization pertaining to the embodiment of the present invention. With reference to the programs shown in FIG. 5, description is made on operations of the compiler device 200 pertaining to the present invention.

A program 400 is an example of a loop described in the source program 100, which is a "for" loop written in C language. The "for" loop is composed of 100 iterations. The loop has a loop-carried dependency on variables a and b. The loop does not have a loop-carried dependency on a variable x, which is on the right side of expression for calculating a value of the variable b.

According to the embodiment, it is assumed that a loop shown in the program 400 is executed in parallel by using two processors.

The data dependency analyzing unit 210 detects that the variables a and b are loop-carried dependency variables. The loop parallelizing unit 220 determines that, since the variables a and b are the loop-carried dependency variables, DOALL parallelization cannot be performed on the loop included in the program 400 (S10).

Subsequently, the data parallelizing unit 220 determines whether initial value calculating code addition parallelization is applicable to the loop included in the program 400 (S20). Details are described below.

(1) Judgment as to Whether Loop can be Parallelized

Figure 6:
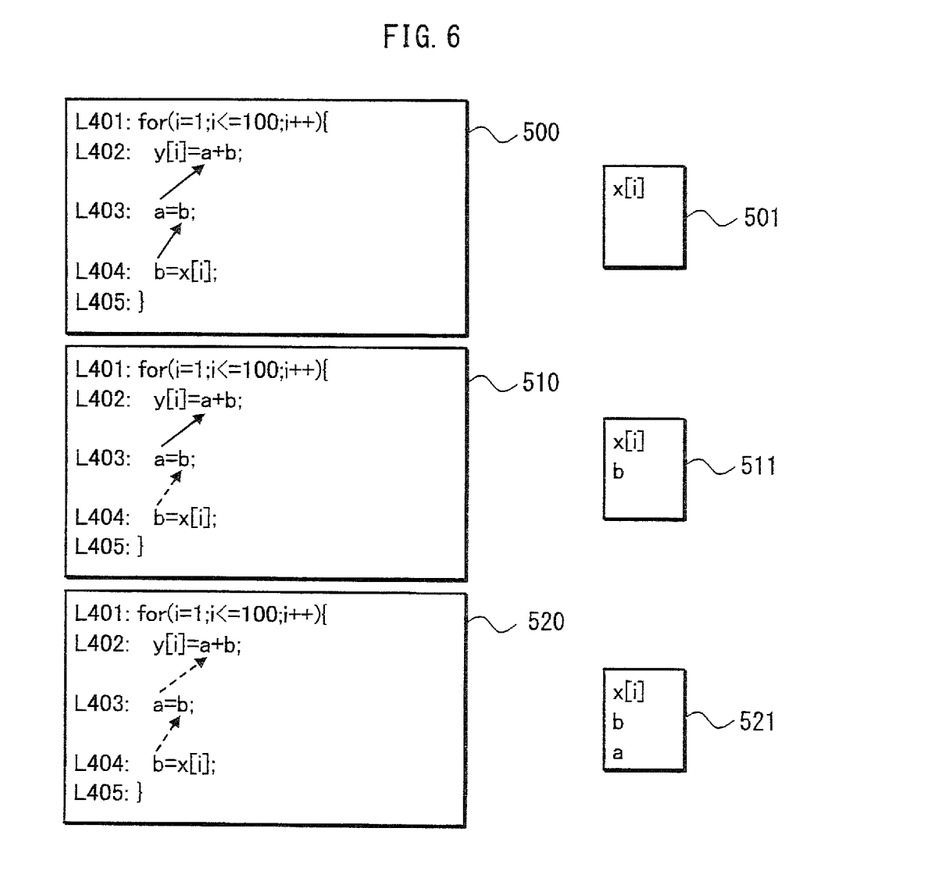
FIG. 6 shows an example of execution of determination as to whether a loop can be parallelized pertaining to the embodiment of the present invention.

FIG. 6 shows an example of execution of determination as to whether the loop included in the program 400 can be parallelized.

In a program 500, loop-carried dependencies in the program 400 are indicated by arrows.

The loop parallelizing unit 220 generates a list 501 including a variable x included in the program 400, on which the loop does not have a loop-carried dependency (S110).

From among variables that are on the left sides of expressions L403 and L404 and are not listed up, the loop parallelizing unit 220 selects the variable b, i.e., the left side of the expression L404 whose variable on the right side is all included in the list 501, and adds the variable b to the list to generate a new list 511 (S120).

Since the variable b is added to the list 511 in S110, the loop parallelizing unit 220 determines YES in S130 and executes processing of S150.

The loop parallelizing unit 220 determines whether the program 400 includes a loop-carried dependency variable that is not in the list 511 (S150). As shown in the program 510, due to the variable a, the program 400 has a loop-carried dependency between the expression L403 and the expression L402 (variable a is a loop-carried dependency variable). The loop parallelizing unit 220 accordingly executes processing of S120 again. Note that a loop-carried dependency due to a variable added to the list is indicated by an arrow with a dashed line.

The list 511 includes the variable on the right side of expression L403, and does not include the variable on the left side of expression L403. The loop parallelizing unit 220 then adds the variable a, i.e., the left side of expression L403 to the list to generate a new list 521 (S120).

Since the variable a is added to the list 521 in S120, the loop parallelizing unit 220 determines YES in S130 and executes processing of S150.

In S150, the program 400 does not include a loop-carried dependency variable that is not in the list 521. The loop parallelizing unit 220 accordingly determines that initial value calculating code addition parallelization is applicable in S160.

According to the above operations, it has been determined that initial value calculating code addition parallelization is applicable to the loop included in the program 400 (S20), and accordingly the initial value calculating code adding unit 222 parallelizes the loop (S21). Details are described below.

(2) Initial Value Calculating Code Addition Parallelization

Figure 7:
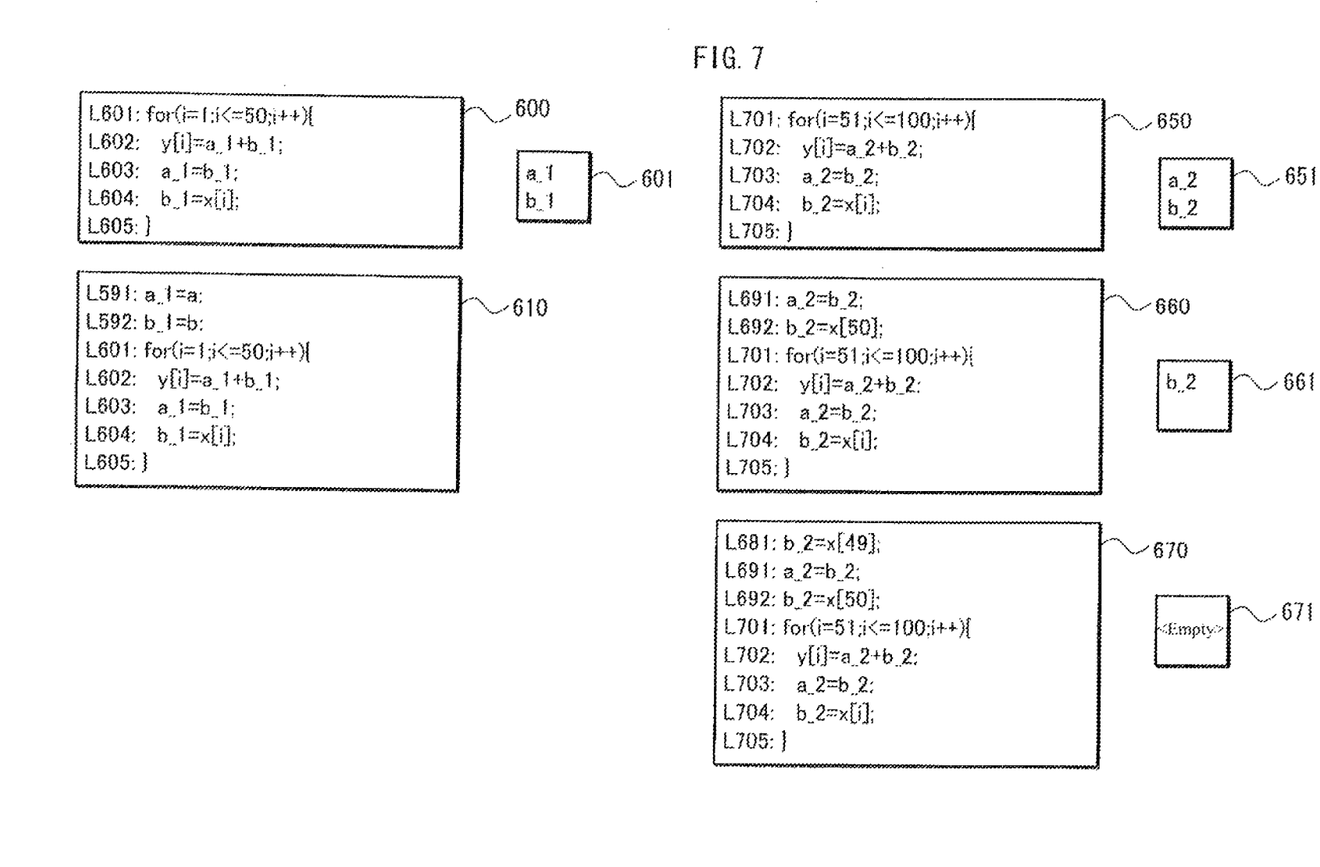
FIG. 7 shows an example of execution of the initial value calculating code addition parallelization pertaining to the embodiment of the present invention.

FIG. 7 shows an example of the initial value calculating code addition parallelization executed on the loop included in the program 400.

The initial value calculating code adding unit 222 substitutes, into a variable p, the initial value 1 of the induction variable i of the loop included in the program 400, and substitutes, into a variable s, an increment amount 1 (amount of change in i when i++ is executed once) of the induction variable i of the loop (S210).

The initial value calculating code adding unit 222 divides the loop into two so as to execute the program 400 by using two processors, and privatizes the loop-carried dependency variables a and b (S220). The results are shown as a program 600 and a program 650. In the program 600, the variables a and b are changed to variables a_1 and b_1. In the program 650, the variables a and b are changed to variables a_2 and b_2.

Processing from S231 to S237 are executed on both the program 600 and the program 650.

First, description is made on addition of codes to the program 600.

The initial value calculating code adding unit 222 substitutes the initial value 1 of the induction variable i of a subloop into a variable q (S231).

The initial value calculating code adding unit 222 generates a list 601 including the loop-carried dependency variables a_1 and b_1 (S232).

The initial value calculating code adding unit 222 compares the variable p with the sum of variables q and s (S233). In this case, q=1, p=1, and s=1. Accordingly, q is smaller than p+s, and processing of S237 is executed.

The initial value calculating code adding unit 222 adds expressions L591 and L592 to the beginning of the program 600 (S227). These expressions are for substituting the variables a and b, which are not privatized, into the privatized loop-carried dependency variables a_1 and b_1, which are included in the list 601. A program after addition of the code is shown as a program 610.

Subsequently, description is made on addition of a code to the program 650.

The initial value calculating code adding unit 222 substitutes, into a variable q, the initial value 51 of the induction variable i of a subloop (S231).

The initial value calculating code adding unit 222 generates a list 651 including the loop-carried dependency variables a_2 and b_2 (S232).

The initial value calculating code adding unit 222 compares the variable p with the sum of variables q and s (S233). In this case, q=51, p=1, and s=1. Accordingly, q is greater than p+s, and processing of S234 is executed.

The initial value calculating code adding unit 222 substitutes 50, which is a value of q−s, into the variable q, and adds expressions L703 and L704 whose left-sides include the variables a_2 and b_2 included in the list 651 to the beginning of the program 650 as expressions L691 and L692 (S234). In this case, a value of the variable q (q=50) is substituted into the induction variable i. A program to which an initial value calculating code is added is shown as a program 660.

The initial value calculating code adding unit 222 generates a list 661 including the variable b_2, i.e., a loop-carried dependency variable which is included in right sides of the added expressions L691 and L692, and overwrites the list 651 with the list 661 (S235).

The initial value calculating code adding unit 222 executes processing of S233 since the list 661 is not empty in S236.

The initial value calculating code adding unit 222 executes processing of S234 since in S233, q=50, p=1, and s=1 and p is greater than p+s.

The initial value calculating code adding unit 222 substitutes 49 into the variable q, and adds an expression L681 to the beginning of the initial value calculating code of the program 630 (S234). The expression L681 is obtained by substituting the value of the variable q (q=49) into the induction variable i included in the expression L704 whose left side includes the variable b_2, which is included in the list 631. A program to which the expression L681 is added to the beginning of the initial value calculating code is shown as a program 670.

The initial value calculating code adding unit 222 generates an empty list 671 since the right side of the added expression L681 does not include any loop-carried dependency variable, and overwrites the list 661 with the list 671 (S235).

The initial value calculating code adding unit 222 ends initial value calculating code addition parallelization since the list 671 is empty (S236).

According to the above operations, the loop parallelizing unit 220 generates subloops 412 and 422 shown in FIG. 5. The subloops 412 and 422 are obtained by dividing the loop included in the program 400. The "for" loop composed of 100 iterations are divided into two subloops, one of which is composed of 50 iterations from the first iteration to the 50th iteration and the other of which is composed of 50 iterations from 51th iteration to 100th iteration. The compiler device 200 generates the object program 300 in which the subloop 412 and the subloop 422 are assigned to different processors.

An initial value calculating code 411 and an initial value calculating code 421 are each an initial value calculating code. By adding the initial value calculating codes 411 and 421 to the programs 410 and 420, respectively, it is possible to solve a dependency between the 50th iteration and the 51th iteration in the program 400. As a result, it is possible to execute the program 400 in parallel.

<Example of Program to which Initial Value Calculating Code Addition Parallelization is Determined to be not Applicable>

Figure 8:
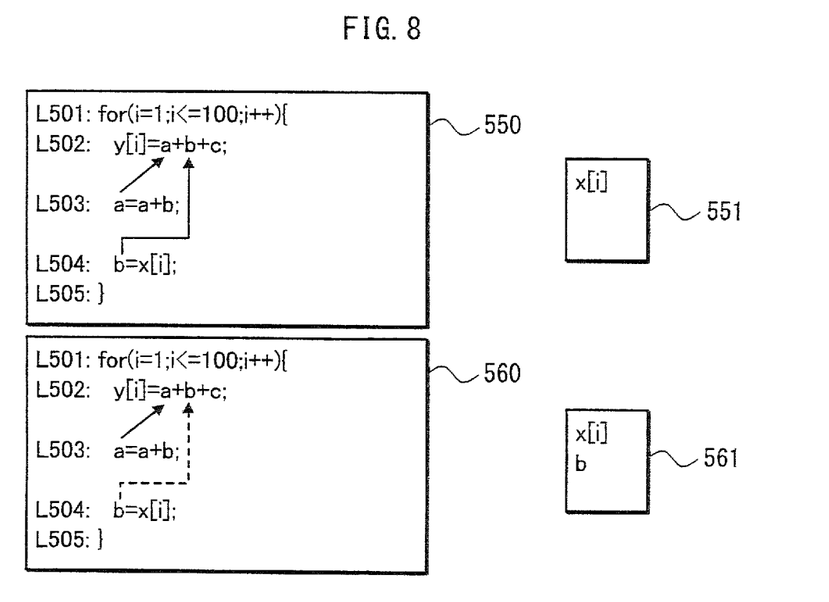
FIG. 8 shows an example of execution of determination as to whether a loop can be parallelized pertaining to the embodiment of the present invention.

Description is made below on the case where initial value calculating code addition parallelization is determined to be not applicable, with reference to FIG. 8.

A program 550 is an example to which initial value calculating code addition parallelization is not applicable. A loop-carried dependency is indicated by arrows.

The loop parallelizing unit 220 generates a list 551 including a variable x, on which a loop included in the program 550 does not have a loop-carried dependency (S110).

From among variables that are on the left sides of expressions L503 and L504 and are not listed up, the loop parallelizing unit 220 selects the variable b, i.e., the left side of the expression L504 whose variable on the right side is included in the list 551, and adds the variable b to the list to generate a new list 561 (S120).

Since the variable b is added to the list 561 in S110, the loop parallelizing unit 220 determines YES in S130 and executes processing of S150.

The loop parallelizing unit 220 determines whether the program 400 includes a loop-carried dependency variable that is not in the list 561 (S150). As shown in the program 510, due to the variable a, the program 400 has a loop-carried dependency between the expression L503 and the expression L502 (variable a is a loop-carried dependency variable). The loop parallelizing unit 220 accordingly executes processing of S120 again. Note that a loop-carried dependency due to a variable added to the list is indicated by an arrow with a dashed line.

The loop parallelizing unit 220 does not update the list since there is no expression whose right side is the variables b and/or x, which are listed up, and whose left side is a variable that is not in the list (S120).

Since no variable remains to be added to the list in S120, the loop parallelizing unit 220 determines NO in S130, and determines that initial value calculating code addition parallelization is not applicable.

Other Modifications Pertaining to Present Embodiment (1) According to the present embodiment, the source program 100 is written in C language, and the object program 300 is written in OpenMP C language. The present invention is, however, not limited to this case. The source program 100 may be written in another language such as FORTRAN, and the object program 300 may be in another language if parallelization is possible. Alternatively, the object program 300 may be an executable object file for a multiprocessor.

(2) In the present embodiment, the variables a and b are scalar variables, and the variable x is an array. The present invention is, however, not limited to this case. Each variable may have any data structure such as a vector variable or a multidimensional array.

(3) In the present embodiment, it is checked whether parallelization can be applicable to the loop included in the source program in each of steps S10, S20 and S30, and if applicable, parallelization is executed in each of steps S11, S21 and S31. The present invention is, however, not limited to this case. For example, after determination as to whether conversion is applicable is performed for all of the loops included in the source program, parallelization may be executed all at once by using the determination result.

(4) In the present embodiment, it is checked whether DOALL parallelization and DOACROSS parallelization are applicable in steps S10 and S30, respectively, and if applicable, parallelization is executed in each of steps S11 and S31. The present invention is, however, not limited to this case. For example, the DOALL parallelizing unit 221 may not be provided, and it may be determined whether initial value calculating code addition parallelization is applicable without determining whether DOALL parallelization is applicable. Alternatively, for example, DOACROSS parallelizing unit 223 may not be provided, and when it is determined that initial value calculating code addition parallelization is not applicable to a loop, sequential processing may be executed on the loop without determining whether DOACROSS parallelization is applicable. If there is any technology for parallelization or improvement of performance, they may be applied. With the above attempt, it is possible to realize a compiler device that has various structures and is characterized in executing initial value calculating code addition parallelization on a loop to which initial value calculating code addition parallelization is applicable.

(5) According to the present embodiment, determination processing from S120 to S150 repeats until variables in the list match the loop-carried dependency variables. The present invention is, however, not limited to this case. For example, the upper limit of the number of execution of processing from S120 to S150 may be set. In this case, when there is a loop-carried dependency variable that depends on an iteration executed a predetermined number of iterations before the first iteration of the divided subloop, initial value calculating code addition parallelization may not be applied. By doing this, it is possible to parallelize the loop only when performance improved due to loop parallelization is greater than overhead due to the added initial value calculating code.

(6) According to the present embodiment, the loop composed of M iterations is executed in parallel with use of N processors. Accordingly, a subloop composed of sequential M/N iterations is assigned to each processor. The present invention is, however, not limited to this case. For example, a subloop assigned to each processor may include different number of iterations.

(7) According to the present embodiment, the amount s of a change in the induction variable i is 1 (increment statement of the induction variable is i++). The present invention is, however, not limited to this case. For example, the increment statement of the induction variable i may be i=i+2, and the amount s of a change in the induction variable i may be 2. Alternatively, the increment statement of the induction variable i may be set to be i−−, and the amount s of a change in the induction variable i may be −1. The expression $q \geq p+s$ in S223 may be displaced with $q \leq p+s$. By doing this, it is possible to implement the present invention on loops in various conditions.

(8) According to the present embodiment, 1 is substituted into the amount s of a change in the induction variable i when the increment statement of the induction variable i is i++. The present invention is, however, not limited to this case. For example, the initial value of s is set to 1 beforehand, and the amount s may be changed when the increment statement of the induction variable i is not i++. By doing this, it is possible to simplify parallelization of most loops in which the increment statement of the induction variable i is i++.

INDUSTRIAL APPLICABILITY

The present invention can easily change a source program for sequential execution to a parallelized object program aimed for a multi-core processor, and be widely used in home appliances equipped with a multi-core processor.

REFERENCE SIGNS LIST 200 compiler device
210 data dependency analyzing unit
220 loop parallelizing unit
221 loop parallelization determining unit
230 loop converting unit
231 DOALL parallelizing unit
232 initial value calculating code adding unit
233 DOACROSS parallelizing unit
300 object program

The invention claimed is:

1. A loop parallelization method for generating an object program for parallel execution from a source program for sequential execution, the loop parallelization method comprising the steps of:

analyzing whether a loop included in the source program includes one or more loop-carried dependency variables, each loop-carried dependency variable being a variable whose value substituted thereto in one iteration of the loop is referred to in another iteration that is executed after the one iteration;

determining whether the loop is a parallelizable loop without synchronization when the loop is analyzed to include the one or more loop-carried dependency variables, the parallelizable loop without synchronization being a loop including one or more loop-carried dependency variables whose values are calculable in all iterations of the loop regardless of whether the loop is sequentially executed; and determining, in order to divide the loop into a plurality of subloops, start positions of the plurality of subloops when the loop is determined as the parallelizable loop without synchronization, generating, for each start position, an initial value calculating code for executing one or more statements in the loop at least once to calculate values of the one or more loop-carried dependency variables at the corresponding start position, dividing the loop into the plurality of subloops based on the start positions, and generating the object program such that each initial value calculating code is executed prior to the corresponding subloop.

2. A compiler device having a processor for generating an object program for parallel execution from a source program for sequential execution, the compiler device comprising:
- a data dependency analyzing unit configured to analyze whether a loop included in the source program includes one or more loop-carried dependency variables, each loop-carried dependency variable being a variable whose value substituted thereto in one iteration of the loop is referred to in another iteration that is executed after the one iteration;
- a loop parallelization determining unit configured to determine whether the loop is a parallelizable loop without synchronization when the loop is analyzed to include the one or more loop-carried dependency variables, the parallelizable loop without synchronization being a loop including one or more loop-carried dependency variables whose values are calculable in all iterations of the loop regardless of whether the loop is sequentially executed; and
- an initial value calculating code adding unit configured to determine, in order to divide the loop into a plurality of subloops, start positions of the plurality of subloops when the loop is determined as the parallelizable loop without synchronization, to generate, for each start position, an initial value calculating code for executing one or more statements in the loop at least once to calculate values of the one or more loop-carried dependency variables at the corresponding start position, to divide the loop into the plurality of subloops based on the start positions, and to generate the object program such that each initial value calculating code is executed prior to the corresponding subloop.

3. The compiler device of claim 2, wherein the loop parallelization determining unit
- determines, as calculable variables, variables that are included in the loop and are not the loop-carried dependency variables, each calculable variable being a variable whose value is calculable in all iterations regardless of whether the loop is sequentially executed,
- performs processing for determining, when variables required for calculating a value of one of the loop-carried dependency variables are all calculable variables, the one loop-carried dependency variable as a calculable variable, and performs the processing on another one of the loop-carried dependency variables each time the number of loop-carried dependency variables determined as calculable variables increases, and
- when all variables included in the loop are calculable variables, determines the loop as the parallelizable loop without synchronization.

4. The compiler device of claim 3, wherein the loop parallelization determining unit
- generates a list of calculable variables that are included in the loop and are not the loop-carried dependency variables,
- when one of the loop-carried dependency variables included in the loop is on a left side of an expression in the loop and a variable on a right side of the expression is included in the list, adds the one of the loop-carried dependency variables of the left side to the list as a calculable variable until no variable remains to be added to the list, and
- when all variables included in the loop are included in the list, determines the loop as the parallelizable loop without synchronization.

5. The compiler device of claim 3, wherein the initial value calculating code adding unit
- specifies an iteration of the loop that is to be a first iteration of each subloop,
- replaces the loop-carried dependency variables that are included in the loop with local variables that are unique to each subloop,
- generates, for each subloop, the initial value calculating code for calculating values of the loop-carried dependency variables in the corresponding specified iteration by using a variable that is not a loop-carried dependency variable and for substituting the calculated values into the corresponding local variables, and
- adds each generated initial value calculating code prior to the corresponding subloop.

6. The compiler device of claim 5, wherein for each subloop, the initial value calculating code adding unit
- generates an initial value adding list including loop-carried dependency variables,
- generates an expression based on the loop and adds the expression prior to the corresponding subloop as an initial value calculating code, a value of a left side of each expression being selected from the corresponding initial value adding list and referred to in the first iteration of the corresponding subloop, and
- repeats, until the second adding list includes no variable, processing for generating a second adding list including a loop-carried dependency variable included in a right side of the corresponding initial value calculating code that is added last time, for generating, based on the loop, an expression whose left side includes a variable that has been added to the corresponding second adding list, and for adding, as an initial value calculating code, the expression prior to the corresponding initial value calculating code that has been added.

7. A non-transitory computer-readable recording medium on which a compiler program is recorded, the compiler program executing a method for generating an object program for parallel execution from a source program for sequential execution, the method comprising the steps of:
- analyzing whether a loop included in the source program includes one or more loop-carried dependency variables, each loop-carried dependency variable being a variable whose value substituted thereto in one iteration of the loop is referred to in another iteration that is executed after the one iteration;
- determining whether the loop is a parallelizable loop without synchronization when the loop is analyzed to include the one or more loop-carried dependency variables, the parallelizable loop without synchronization being a loop including one or more loop-carried dependency variables whose values are calculable in all iterations of the loop regardless of whether the loop is sequentially executed; and
- determining, in order to divide the loop into a plurality of subloops, start positions of the plurality of subloops when the loop is determined as the parallelizable loop without synchronization, generating, for each start position, an initial value calculating code for executing one or more statements in the loop at least once to calculate values of the one or more loop-carried dependency variables at the corresponding start position, dividing the loop into the plurality of subloops based on the start positions, and generating the object program such that each initial value calculating code is executed prior to the corresponding subloop.

* * * * *